Aug. 31, 1965 F. H. BRAY ETAL 3,204,036

AUTOMATIC TELEPHONE EXCHANGES

Filed June 23, 1960 3 Sheets-Sheet 1

Inventor
F.H.BRAY-J.M.RIDIER

By Robert Harding Jr
Attorney

Inventor
F.H.BRAY-J.M.RIDLER

By [signature]
Attorney

Inventor
F.H.BRAY-J.M.RIDLER
By
Attorney

United States Patent Office 3,204,036
Patented Aug. 31, 1965

3,204,036
AUTOMATIC TELEPHONE EXCHANGES
Frederick Harry Bray and John Malcolm Ridler, London, England, assignors to International Standard Electric Corporation, New York, N.Y.
Filed June 23, 1960, Ser. No. 38,247
Claims priority, application Great Britain, July 9, 1959, 23,608/59
8 Claims. (Cl. 179—18)

The present invention relates to automatic telecommunication exchange systems.

The provision of two or more classes of service in telephone exchanges makes it necessary to be able, when a call is initiated, to identify the class to which the calling subscriber belongs. The result of this identification is used in the determination of the meter rate appropriate to the caller's line, and in the treatment of the call according to the class of service to which he is entitled. By providing class-of-service indicating circuits, connectable directly to subscriber's lines and to registers, and by treating the identification as a register function, a flexible and economical arrangement is obtained.

According to the invention therefore, there is provided an automatic telecommunication exchange system of the type having registers to record the number of a wanted subscriber's line and to control the setting-up of the wanted connection, in which each register is provided with signalling means to transmit signals over the path by which the register has been seized by the calling subscriber's line circuit to a class-of-service indicating circuit common to a plurality of subscriber's lines including the calling line, and with receiving means to receive from the said indicating circuit by a direct path independent of said subscriber's line circuit signals indicating the class of service of the line, whereby the register is enabled to control the wanted connection in accordance with the class of service of the calling subscriber's line.

Another necessary register function is the requirement to transmit signals over an outgoing junction for completing the setting-up of the call, when the call is to a distant exchange. Heretofore it has been usual to effect this transmission over the switching equipment carrying the speech connection from the calling subscriber to the outgoing junction, but if it were arranged to avoid the use of this switching equipment for carrying this signal transmission some reduction in the size and complexity of the large number of circuits associated with this switching equipment would be possible.

According to the invention therefore, there is also provided an automatic telecommunication exchange system of the type having registers for recording the number of a wanted subscriber's line and controlling the setting-up of the wanted connection, in which the connection from a register to the circuit associated with an outgoing junction, for the purpose of transmitting over the junction the signals necessary for completing a call to a distant exchange, is effected over a group of register switching equipment which is additional to and separate from the main switching equipment carrying speech or supervisory signals, whereby the size and complexity of the circuit means associated with the main switching equipment are reduced.

An embodiment of the invention will now be described with reference to the accompanying drawings, in which:

FIGS. 1 and 2 of which FIG. 2 should be placed to the right of FIG. 1, show a simplified diagram of an exchange according to the present invention.

FIG. 3 shows part of FIG. 1 in more detail.

The invention shown and described here is an improvement over U.S. Patent No. 2,872,527 entitled "Automatic Telecommunication Exchanges," granted to F. H. Bray and R. G. Knight on February 3, 1959, and assigned to the assignee of this invention. Reference to that patent will provide a full disclosure of the circuits shown herein by hollow blocks. As an aid to the reader, the hollow blocks of the attached drawings relate to the parent patent in the following manner:

| Designation in the attached drawing: | A corresponding detailed disclosure is shown in U.S. Patent No. 2,872,527, as follows: |
|---|---|
| LC | Line-circuit in FIG. 6. |
| IL | First link in FIGS. 9–12. |
| RH | Register-hunter at the bottom of FIG. 10. |
| TCA | Terminal connector in FIGS. 8–9. |
| MSN | Main switching network in FIGS. 2–4, FIGS. 12–13, FIGS. 15–16, FIGS. 18–19 RSN . . . (additional switching network, similar to MSN). |
| RSA | Route selector A in FIGS. 4–5 and FIGS. 28A–B (route selector B). |
| RSB | (Similar to RSA). |
| REG | Register in FIGS. 29–35. |
| CLM | Called line marker in FIGS. 22–24. |
| DNC | Call distributor in FIGS. 36–38 (class of service distributor). |
| DCS | (Similar to DNC). |
| FL | Final link in FIGS. 19–21. |
| TCB | Terminal connector in FIGS. 8–9. |
| JSS; JST; JSD | Scanning circuits: any reference to an electronic counter with an output per stage will do. |
| DJL; JJL; STDL | Various sorts of links for outgoing calls: no specific reference needed, similar to FL in most respects. |
| CSA; CSB; MD | Class of service detector: tuned circuit tuned to respond to particular class of service audio segment. Motor detector. |

*General description*

The automatic telephone exchange to be described herein follows the principles described in Patent No. 2,872,527.

The central portion of the exchange is three sets of co-ordinate multi-switches which are so interconnected as to form a primary/secondary/tertiary switching network. These sets of multi-switches, known as the A, B and C frames, are symmetrical about the B frame since the number of inlets to a B frame multi-switch equal the number of A frame multi-switches, the number of outlets from a B frame multi-switch equals the number of C frame multi-switches, and the number of A frame multi-switches equals the number of C frame multi-switches. This array of multi-switches is controlled by a route selector, which is an electronic gating array simulating switching paths through the A–B–C frames.

Subscribers' lines are connected to further co-ordinate multi-switches known as terminal connectors, some of whose inlets (the lines are regarded as the outlets) are connected via first links to inlets to A frame multi-switches, while the others of their inlets go via final links to outlets from the C frame. In the exchange described in the above-mentioned patent, the co-ordinate multi-switches use gas tubes as the cross-points, each cross-point between an inlet wire and an outlet wire having a double anode-single cathode tube, such as is described in U.S. Patent No. 2,775,722. The tube which interconnects an inlet wire and an outlet wire has that inlet wire connected to one of its anodes and that outlet wire connected to the other of its anodes, and when a connection is to be set up between that inlet wire and that outlet wire, anode-cathode discharges are set up in that tube. There is then a low impedance, substantially noise-free connection for speech and signals between the tube's anodes.

When a call is initiated, the calling line is extended via its terminal connector co-ordinate multi-switch to a free first link, which (as mentioned above) is connected to an A-frame inlet. A free register is seized from the first link via a register-connector co-ordinate multi-switch, which is also an electronic multi-switch. The registers are served by a class of service distributor, which tests them sequentially in search of one which has been newly seized. When a register in this condition is found, the register receives from the distributor "go-ahead" signal. This causes an alternating current, which may be of super-audio frequency, to be sent via the register-connector, the first link and the terminal connector to the calling subscriber's line. This signal activates a class of service detector which serves a number of lines.

For each class of service there is a class of service indicator or detector, connected to the lines which belong to its class. Examples of classes of service are coin box lines, and normal private-house subscriber's lines. These detectors are each connected to all registers.

At the caller's line circuit the class-of-service signal is passed to, and activates, the appropriate class-of-service detector and this emits its signal. This signal is only effective in a register which has just transmitted an identification signal and since only one register can transmit such a signal at any one time there is no ambiguity. Thus a calling line has seized a register and the class-of-service to which it is entitled is recorded in that register. This information is of significance mainly for metering, and is sent from the register as and when necessary for this purpose. All of the above operations, of course, have been effected at "electronic" speeds, and as soon as the newly-seized register receives the class-of-service signal, it sends dial tone to the calling subscriber.

The registers are served by a second distributor which is known as a call distributor, which tests the registers singly and successively in search of one which has received enough digits to commence to set up a connection. In the first instance it is assumed that the call to be dealt with is a local call, in which case this condition exists when all digits are in. When the call distributor finds a register in this condition, it gives it a go-ahead signal.

When the register receives the go-ahead signal, it transfers the wanted number to the called line marker, which marks the wanted line directly over a path separate from the exchange speech path. If the wanted line is free, that line seizes a free final link via the terminal connector, which final link is connected to an outlet from one of the C-frame multi-switches. If the wanted line is busy, then nothing happens until a predetermined time has elapsed—after a switching operation would have commenced if the line were free—when busy tone is connected to the caller and the register released. In any case, the marker is released after the specified time has elapsed.

The register now causes the inlet to an A-frame multi-switch to which the seized first link is connected to be marked and also causes the outlet from a C-frame multi-switch to which the seized final link is connected to be marked. The route selector, which (as already mentioned) is a gating array which simulates by its gates paths from an A-frame multi-switch to a B-frame multi-switch, selects a free path between the marked A-frame inlet and the marked C-frame outlet, which path is then set up under timed pulse control. Since, due to the call distributor, only one register can pass information to the called line marker, there is no ambiguity possible: hence the route selector only receives information for one call at a time. The register (and marker) are released after defined periods under control of the timing pulse arrangements. Thus the connection has been set up, and so ringing tone and current are applied from a convenient point, e.g. from the final link.

Busy tone is also applied from the first link, as is number-unobtainable tone when the latter is needed.

Now it is necessary to consider what happens where the call is an outgoing one. The junction via which such connections leave the exchange are connected via final links to C-frame outlet, i.e. no outgoing terminal connectors are used in this case.

When a call is an outgoing call the register gives its "ready" indications to which the call distributor responds after sufficient digits have been received to determine the routing of the call. Normally, in the British Post Office system this would be after the exchange code digits had been received. Thus if HOLborn 8765 were the wanted number, the register tests as "ready" to the call distributor after reception of three digits HOL (i.e. 465). In this case, only these three digits are passed to the called line marker, which determines the wanted junction group, and causes a free junction in that junction group to be marked.

In addition to the main switching network formed by the A, B and C-frames there is a further switching network known as the register switching network. This is also a primary/secondary/tertiary network, but is considerably smaller than is the main switching network. The A-frame inlets to this network are connected to the registers and the C-frame outlets are connected to the junctions' links. When such a junction marking is performed, the register marks its inlet to the register switching network, and the seized link marks its outlet from the C-frame of the register switching network.

The register switching network is served by a route selector (RSB), known as route selector B (the route selector (RSA) for the main switching network being known as route selector A) and this is similar to, but, of course, smaller than route selector A. When the "calling" register has marked its inlet to the register switching network (RSN) and the seized junction has marked its outlet from the register switching network, route selector B selects a free path therebetween, which path is established and the route selector released.

While all this is in progress, at the very very fast "electronic" speeds, of course, the register is still receiving dialled digits. While these digits are being received, the register transmits the appropriate digits for the call as voiced frequency signals via the register switching network to the outgoing junction. Here they are sent out in a manner appropriate to the junction.

When the digits have all been sent, a special signal is sent to the junction, also via the register switching network, which causes the junction to mark its outlet from the C-frame of the main switching network. At the same time the register causes the first link to mark its inlet to the main switching network. Route selector A then causes the connection to be set up in the usual way via the main switching network after which the register is released and the connection via the register switching network broken down.

The use of an additional switching network in the manner described briefly above allows the first links to be simpler than would be the case if signalling of the outgoing digits was via the main switching network. If there was no register switching network, the first link would have to be capable of receiving information from a calling subscriber's line and passing it to the register and also of receiving information from the register and passing it to the A–B–C frames of the main switching network. This would necessitate the use of isolating means in these links. Hence at the cost of a relatively small amount of added equipment, the first links, of which a large number are needed (e.g. 1500 in a heavy traffic 10,000 line exchange) can be simplified.

It should be noted that in a smaller exchange than that visualised in the preceding paragraph, the register switching network could be simpler than in the example described. Thus it could be a primary/secondary co-ordinate array, or even (in a fairly small exchange) a single co-ordinate multi-switch. In such case the route selector B would also be considerably simplified.

Junctions incoming to the exchange, and very heavy-traffic subscriber's lines, can be connected via first links directly to the A-frame i.e. not via terminal connectors. The heavy traffic lines so connected would also be connected via final links to C-frame outlets.

*Detailed description (FIGS. 1–3)*

Figure 1:
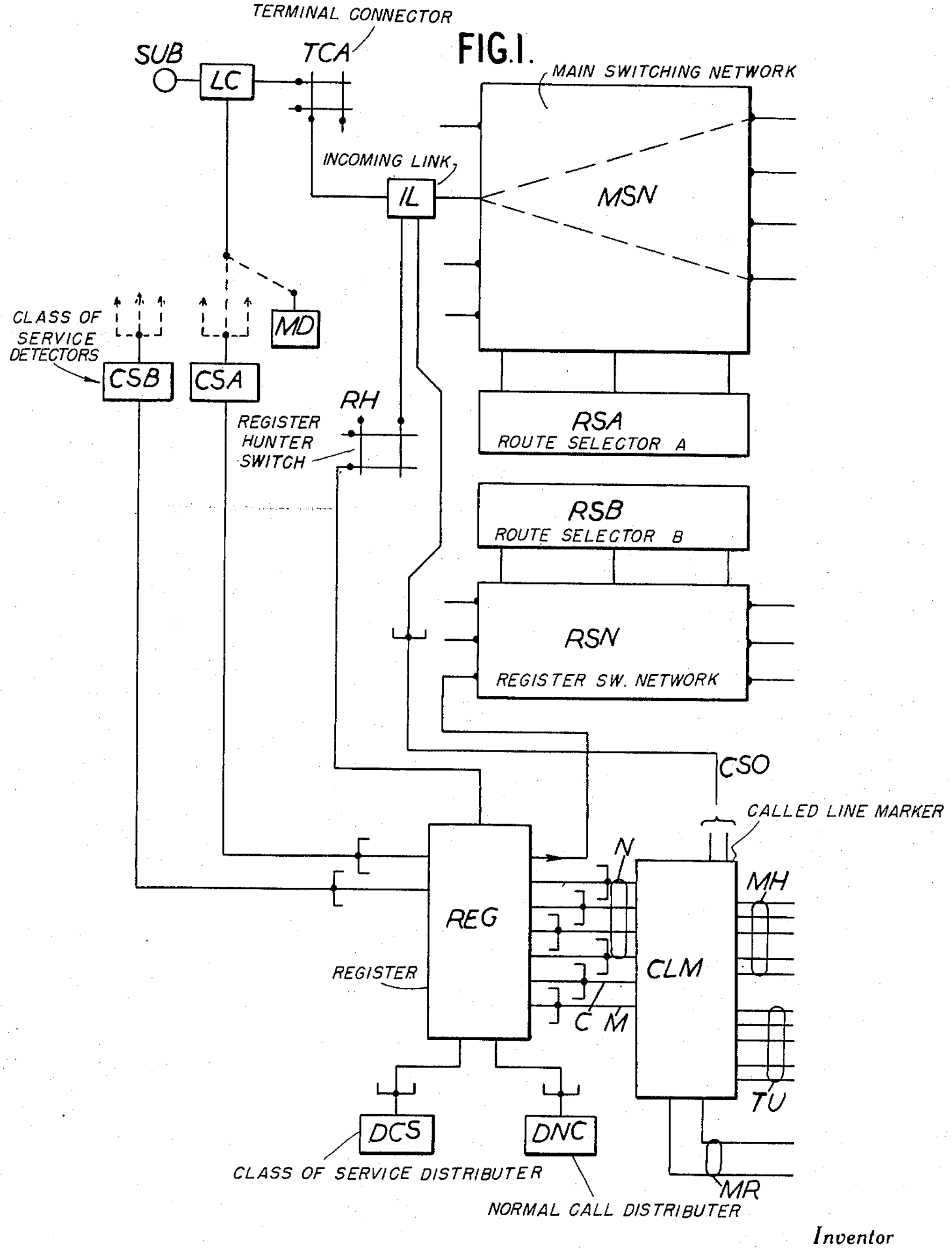
Figure 2:
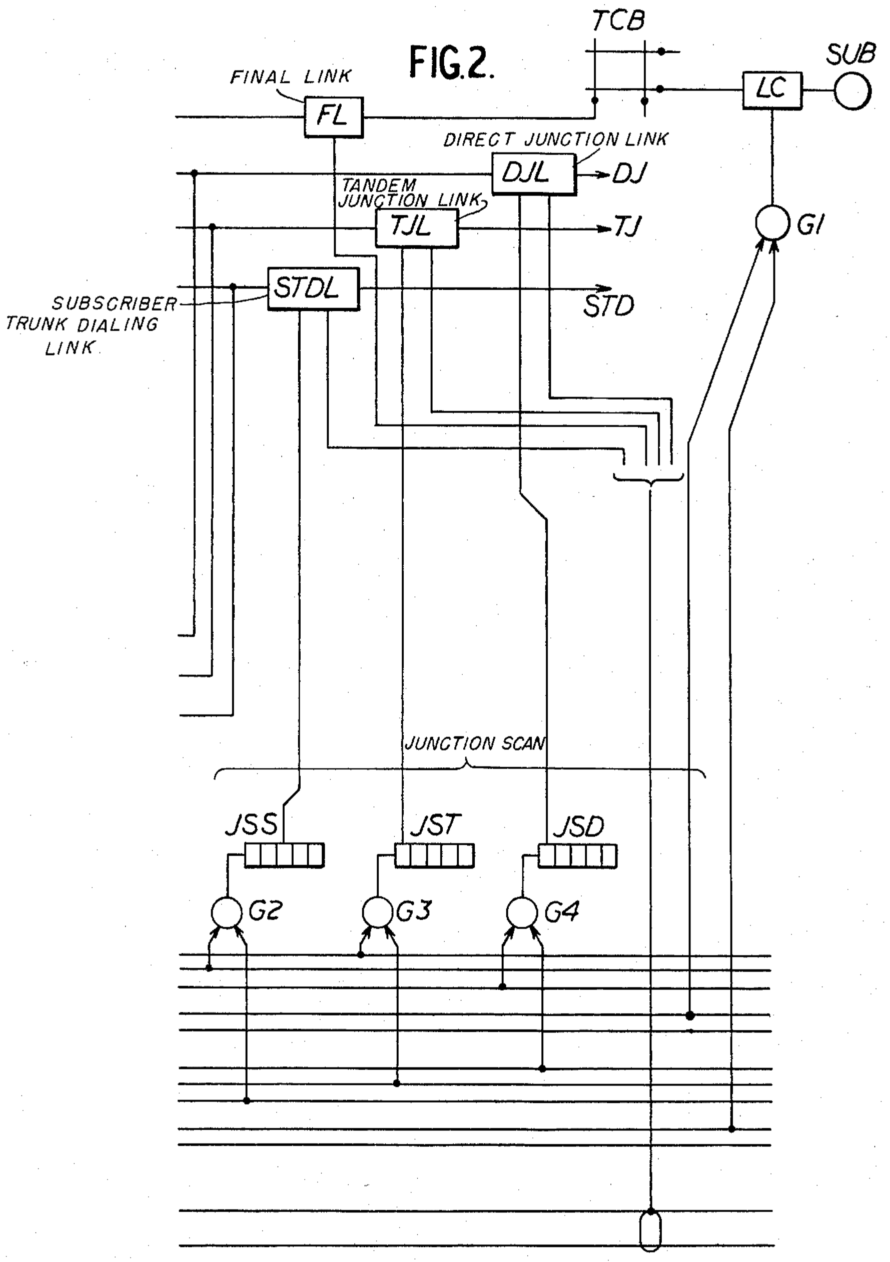
Figure 3:
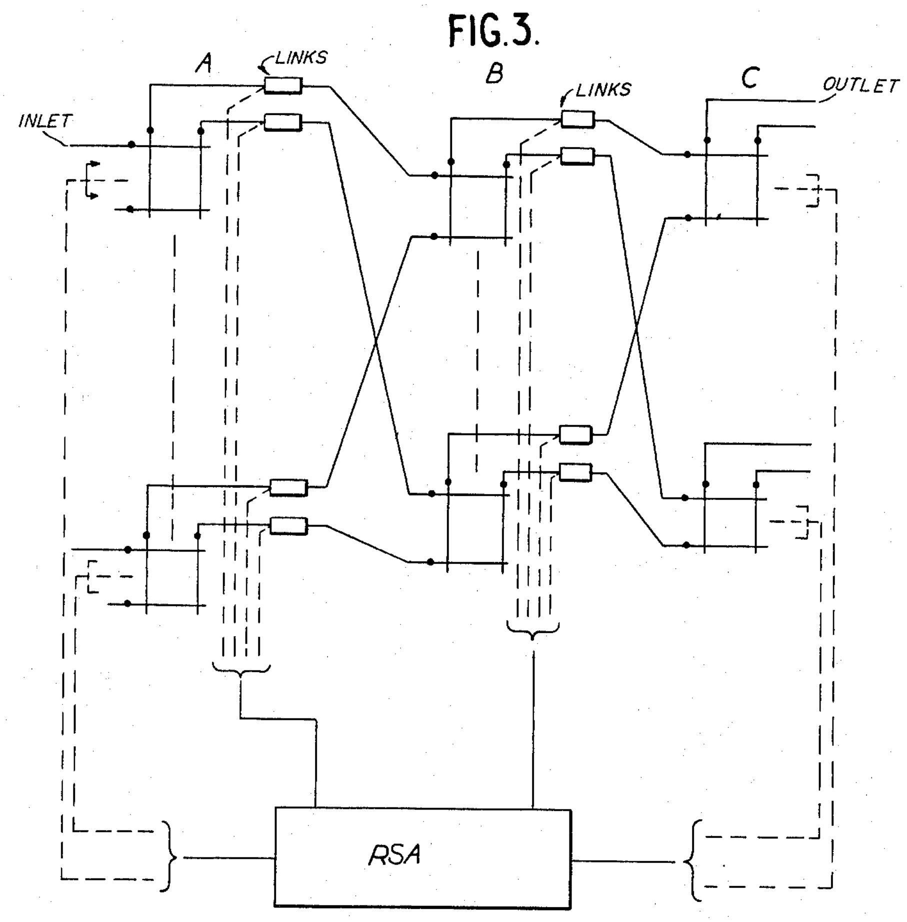

FIGS. 1 and 2 together show a simplified schematic of an exchange in which the above-described principles are embodied, while FIG. 3 shows separately the trunking of the switching stages which form the main switching network MSN. In view of the preceding general description the easiest way to describe the exchange is to describe the progress therethrough of a local call and of an outgoing call.

The subscribers' lines are arranged in groups of 50, each group served by a terminal connector multi-switch whose inlets are connected respectively to first links and a terminal connector multi-switch whose inlets are connected to final links. In fact, these two can be combined into a single multi-switch with two sets of inlets. However, from the "circuit" aspect they are two separate switches, and have been so represented in FIGS. 1 and 2.

When a subscriber initiates a call, the change in his loop from open to closed is detected in his line circuit LC, FIG. 1, which causes his outlet of the terminal connector TCA to be marked. A free inlet to this terminal connector is seized in a manner similar to that described in detail in Patent No. 2,872,527, this free inlet being connected to a first link such as 1L. The number of first links depends on the traffic expected, and some at least of the first links may be accessible via more than one terminal connector.

It will be noted that in the exchange described, herein, unlike that described in the above-mentioned patent, there is no scanning of subscribers' lines to detect calling lines. This introduces a risk of double connection but it is thought that the probability of double connection is low. Hence the saving which is permitted at the cost of this risk is considered to be justified. Clearly if it were not justified, then the line scanning as in the above-mentioned patent could be used.

When a first link such as 1L has been seized in the manner described above, it marks an inlet to a register hunter co-ordinate multi-switch RH. This, like the speech path switches is a single-wire electronic multi-switch in which each cross-point uses the double-anode-single-cathode tube of patent No. 2,775,722, mentioned above. In passing, it is worth mentioning that the exchange being described uses a single-wire speech path within the exchange.

When an inlet to the switch RH is marked as just mentioned, the outlets therefrom, each of which gives access to a register such as REG, are scanned, and the first outlet giving access to a free register is seized. The register, e.g. REG, is also seized so that it is connected via RH to the first link.

For each class-of-service catered for by the exchange, e.g. normal subscriber's line, coin-box line, there is a class-of-service detector. Two of these, CSA end CSB have been shown in FIG. 1. Each detector is connected to all of the lines of its class, thus the line shown is connected to detector CSA. In addition each class-of-service detector is connected to every register. This is indicated in FIG. 1 by the leads with commoning symbols which extend from CSA and CSB to the register REG.

The registers are served by a distributor DCS, the class of service distributor, and this tests the registers sequentially in search of a newly-seized register. When a register, e.g. REG, is found in this condition, the distributor DCS stops, and gives that register a "go-ahead" signal, which causes it to transmit a class of service identification signal. This signal, which is a super-audio signal, e.g. 8 kc./s., passes to the calling line circuit LC via the switch RH, first link 1L and switch TCA. This super-audio signal is applied to the caller's class of service detector, CSA in this case. Each of these detectors includes a circuit responsive to this signal, which when it receives such a signal produces an output signal on the lead connecting it to all registers. Such a signal can only be effective on the register which sent the identification signal. This is arranged by providing the leads from the detectors to the registers with inlet gates in each register which only open when that register emits an identification signal. Hence the newly-seized register receives via a path separate from the speech path an indication of the caller's class. This indication is stored in the register, and the distributor DCS is released, and continues in its test cycle.

The distributor DCS, is similar to the normal call distributor DNC to be described later. This, in turn, follows the principles of the call distributor of the exchange described in Patent No. 2,872,527. This identification technique can also be used for calling subscriber identification where this is required.

As soon as the register REG has received a class of service indication for the calling line in the manner described above, it causes dial tone to be transmitted to the calling subscriber, who thereupon dials the wanted number.

First the establishment of a connection for a local call will be described. The subscriber's line relay (in his line circuit) follows the dialling, and repeats the signals via the switch TCA to the first link 1L. The latter repeats them to the register as voice frequency signals, where they are detected and recorded.

The registers are served by a second distributor the call distributor DNC mentioned above, and this tests the registers sequentially in search of one which is ready to commence the establishment of a connection. In the case of a local call this condition exists after all the dialling digits are in. Hence in due course DNC tests REG and finds it in this condition: i.e. ready to set up a local call. When this occurs, DNC stops and gives the register a "go-ahead" signal in a manner similar to that described for DCS.

In response to the reception of this go-ahead signal, the register REG transmits the dialled digits—the four numericals—over the leads shown at N in FIG. 1 to a called line marker, of which there is one, CLM. It also sends over one of the leads shown at C an indication of the caller's class of service, and on one of the leads shown at M, the meter rate for the connection. This latter the register determines from the class of service and the wanted number. CLM has two blocks of output leads, MH and TU, there being 100 leads in each set. Leads of set MH each correspond to a different thousands-hundreds combination and leads of TU each correspond to a different tens-unit combination. Hence marker CLM energizes two leads which together identify the wanted line.

Each line has a two-input AND-gate such as G1, one input coming from that line's lead of set MH and the other from its lead of set TU. When a line's gate has both its inputs energised, its gate opens and its line circuit LC tests to see if it is busy or free.

If the wanted line is busy, no further operation can occur, so that after a certain predetermined period has elapsed, the circuit "assumes" that the wanted line is busy if nothing has happened. The result of this is that busy tone to be sent to the caller from the first link 1L, and the register is released. If the number dialled was an unobtainable number, the indication that this is so is provided by the marker CLM since certain combinations of leads corresponding to unobtainable numbers are connected together and to the first links. Since only one first link, that connected to the register which has received a go-ahead signal, is working, the indication that an unobtainable number has been dialled is only effective on the first link via which that register was seized, and only while the go-ahead signal is present. This first link therefore causes NU (number unobtainable) tone to be applied therefrom.

If the wanted line is free, its outlet of the terminal connector TCB, FIG. 2 is marked as "wanted," with the result that a free final link such as FL is seized. As is the case in much of the operation of the present exchange this occurs in a similar manner to the corresponding operation of the exchange described in Patent No. 2,872,527. The meter rate appropriate to the connection is sent via one of leads MR, which extend from CLM to all final links so that this meter rate indication is offered to all final links. However, only one which is newly-seized can respond to and store this indication. Also sent from marker CLM is a class of service indication which, via leads such as CSO is offered to all first links. Only that involved in the connection being dealt with can respond. Thus the meter rate is recorded in the final link and the class of service in the first link.

The register REG now applies a marking condition via 1L to the inlet to the main switching network MSN to which 1L is connected, while a marking condition is applied via FL to the outlet from MSN to which FL is connected. The control of operations is under timed pulse control, and these markings occur simultaneously.

It is now useful to refer to FIG. 3 in which the trunking diagram of the main switching network MSN is shown schematically. This is a symmetrical primary/secondary/tertiary array of electronic co-ordinate multi-switches, and the first and last switches of the A, B and C frames, as the three stages are called, are shown. The application of a marking to an inlet to an A frame multi-switch causes indications of the identities of all available outlets from that A frame multi-switch, each giving access to a different B frame multi-switch, to be sent to the route selector RSA. In addition, the marking of an outlet from a C frame multi-switch causes indication of the identities of all available inlets to that switch, each arriving from a different B frame switch, to be sent to route selector RSA. These markings are only effective for one connection at a time, so that there is no risk of double connections.

On the information which it has received, RSA performs a "matching" test as a result of which it chooses a free outlet from the appropriate A-frame switch to which corresponds a free inlet to the C frame switch. To these, as a result of the symmetry of the array, there corresponds a usable path via a B frame switch. This path is marked by the route selector, and set up from left-to-right, i.e., via A frame switch, via B frame switch and via C frame switch in a manner similar to that of the above-mentioned Patent No. 2,872,527. This occurs under timed pulse control, and hence when the appropriate time has elapsed route selector RSA is released. In the unlikely event of there being no usable free path through main switching network MSN, the connection of the wanted line via its terminal connector is broken down and the caller receives busy tone as already described.

The register and marker are now released, and ringing tone and ringing current supplied to the calling and wanted lines respectively from the final link FL. When the wanted subscriber replies, therefore, the connection is fully established. The call is maintained under the control of the calling subscriber, and switch-hook supervision is performed at the first link. When the calling subscriber hangs up, clear down signals sent via the speech path cause the connection to be broken down.

Metering signals are generated at the final link and are sent as bursts of super-audio frequency to the calling line, where they are responded to by the caller's meter detector MD (FIG. 1). The rate at which these signals are sent is determined by the meter rate indication received from marker CLM. The class of service recorded in the first link, together with those meter signals, control the meter operation. This, of course, is also the case for outgoing calls.

Now it is necessary to deal with outgoing calls. Operation up to and including the commencement of the reception of dialed digits is the same as for a local call. However, if the exchange digits received are other than those for the register's own exchange, the register assumes its condition of readiness to commence call setting immediately on reception of the exchange designation digits. Hence when the distributor DNC tests a register in this condition it gives it a "go ahead" signal, which causes the register to pass the exchange designation digits to the marker CLM. The latter determines the metering rate, and also marks one lead of MH and one of TU which identify a group of junctions giving access to the wanted exchange. The leads marked for an outgoing call may be additional to those used for local calls.

In the exchange described there are three varieties of outgoing junction, and one of each is shown. Thus DJ is a direct junction to a nearby exchange, TJ is a tandem junction to a tandem exchange (where there is no direct junction to the wanted exchange), while STD is a junction used for subscriber trunk dialling, digits being sent over all of these forms of junctions as D.C. impulses. There may be several groups of each, as required by the exchange. For each such junction group there is an AND-gate such as G2, G3, G4, which is similar to G1, and a so-called junction scan circuit such as JSS, JST and JSD.

It will be assumed that the call being set up needs a tandem junction of the group to which TJ belongs. Therefore the outputs from marker CLM causes gate G3 to open, and this causes the junction scan circuit JST to test the junctions of its group sequentially in search of one which is free. When such a junction is found a marking is applied to the junction circuit TJL. This acts as a final link therefor, being connected to an outlet from main switching network MSN, and as the junction circuit.

Each junction's link is connected to an outlet from the additional switching network RSN, known as the register switching network, and the registers are each connected to an inlet to this network. Network RSN is primary/secondary/tertiary array similar to, but smaller than, main switching network MSN. At this stage, the timed control causes the seized link TJL and the register REG to mark the appropriate outlet from an inlet to network RSN. A route selector RSB is provided for RSN, and this selects a free path therethrough, which path is established so that the register is now connected via RSN to the seized junction's link TJL.

It should be noted that, in certain cases where there are a relatively small number of registers and junctions to be dealt with, RSN can be simpler than a three stage array. It could, for instance, be a two-stage (primary/secondary) array, or even a single switch. In such case the route selector RSB would, of course, be correspondingly simplified.

While the operations described above have been in progress, the register has been receiving the numerical digits which followed the dialled exchange designation digits. When the connection via RSN has been established, the register REG commences to send as much as is needed of the dialled digits via the network RSN and link TJL to the seized junction, TJ. In the case of a tandem junction this would include either the exchange code as dialled or a translation thereof, plus the numericals, these being sent over the junction as D.C. impulses. The information passes to the link TJL as V.F. pulses, where they are converted to D.C. impulses. Operation is similar for a subscriber trunk dialling junction. In this case it will be noted that there may be more digits than in the case of a tandem junction. For a direct junction the operation is as for a tandem junction except that only the numericals are sent.

When the last digit has been sent, a special signal is sent from the register REG to the link TJL, which thereupon marks itself as an outlet from network MSN. The register REG then releases, and this causes 1L to mark itself as an inlet to MSN. The route selecter RSA then chooses a free usuable path via MSN, in the same manner as for a local call, and thus the connection has been extended to the appropriate junction. The release of register REG causes the connection via network RSN to be broken down. Marker CLM has already been released in the usual manner since, when it is seized, it is only held for a fixed period.

Meter signals are sent at the appropriate rate from the outgoing junction circuit to the calling line after the wanted subscriber has replied, these signals operating meter detector MD. The indicating of this rate is sent from the register to the outgoing junction circuit at any convenient time, in this case when dialling has been completed and before the first link has been connected to the junction.

As for a local call, the connection is held under the control of the calling subscriber's line.

It is to be understood that the foregoing description of specific examples of this invention is not to be considered as a limitation of its scope.

What we claim is:

1. An automatic telecommunication exchange system comprising: a plurality of lines and stations thereon, line circuits associated with each of said lines, register means, class-of-service indicator means common to a plurality of said line circuits, means responsive to a calling condition on any of said lines for establishing a line-register connection between said calling line and said register means, means responsive to the establishment of said line-register connection for transmitting an interrogating signal from said register means to said indicator means over said line-register connection, and an independent indicator-register connection means acting responsive to said interrogation signal for transmitting a class indication signal independent of said line-register connection to said register.

2. The automatic telecommunication exchange system of claim 1 wherein the interrogating signal is a super-audio frequency signal.

3. The automatic telecommunication exchange system of claim 1 wherein there is provided a plurality of class-of-service indicator means to indicate different classes of service and means for connecting said indicator means directly to a plurality of registers over said indicator-register connections.

4. An automatic telecommunication exchange system serving subscriber lines and trunk lines, outgoing junction means associated with said trunk lines, main switching apparatus for extending connections between calling and called ones of said lines and trunks, register means, means for connecting said register means to a calling line to register digit information indicative of a called one of said lines or trunks, means responsive to said digit information indicating a called line for marking said line and controlling the said main switching apparatus to extend a connection from said calling line to said called line, register switching apparatus, means responsive to said digit information indicating a called trunk for marking said called trunk and for operating the register switching apparatus for connecting said called trunk to said register means, means responsive to the establishment of said register-trunk connection for transmitting control signals over said called trunk, and means responsive to the completion of said transmission for controlling the main switching apparatus to connect the called trunk to the calling line and for releasing the register-trunk connection.

5. The automatic telecommunication exchange system of claim 4 in which the said register switching apparatus and said main switching apparatus are each provided with separate control means.

6. The automatic telecommunication exchange system of claim 4 wherein said outgoing junction means comprise: direct junction means for connecting to nearby exchanges, tandem junction means for connecting to tandem exchanges and subscriber trunk dialing junction means for transmitting digits in the form of D.C. impulses; and means responsive to said digit information for seizing the junction means to be utilized.

7. In the automatic telecommunication exchange system of claim 6 wherein said junction seizing means comprises: a group of junction gate means operated to transmit a gate signal responsive to a simultaneous receipt of portions of said control signals emanating from said register means, and junction scan means operated responsive to said gate signals for selecting an idle junction from said outgoing junction means.

8. In the automatic telecommunication exchange system of claim 4 wherein both said main switching apparatus and said register switching apparatus comprise a primary, secondary and tertiary network.

References Cited by the Examiner

UNITED STATES PATENTS

| | | | |
|---|---|---|---|
| 2,211,159 | 8/40 | Pfannschmidt | 179—18 |
| 2,491,291 | 12/49 | Voss et al. | 179—18 |
| 2,651,681 | 9/53 | Borel | 179—18 |
| 2,678,969 | 5/54 | Lomax | 179—27 |
| 2,744,163 | 5/56 | Hertog | 179—18 |
| 2,817,712 | 12/57 | Lomax | 179—18 |
| 2,886,646 | 5/59 | Nilsson | 179—18 |
| 2,916,555 | 12/59 | Gatzert | 179—18 |

ROBERT H. ROSE, *Primary Examiner.*

L. MILLER ANDRUS, WALTER L. LYNDE, *Examiners.*